(12) United States Patent
Huertas et al.

(10) Patent No.: US 9,573,169 B2
(45) Date of Patent: Feb. 21, 2017

(54) CLEANING VEHICLE AND METHOD FOR PARABOLIC TROUGH SOLAR COLLECTORS

(75) Inventors: Juan Jímenez Huertas, Seville (ES); David Gamez Vela, Seville (ES); Elena García Ramirez, Seville (ES)

(73) Assignee: ABENGOA SOLAR NEW TECHNOLOGIES, S.A., Sevilla (ES)

( * ) Notice: Subject to any disclaimer, the term of this patent is extended or adjusted under 35 U.S.C. 154(b) by 1259 days.

(21) Appl. No.: 13/377,227

(22) PCT Filed: Jun. 14, 2010

(86) PCT No.: PCT/ES2010/070394
§ 371 (c)(1),
(2), (4) Date: Feb. 27, 2012

(87) PCT Pub. No.: WO2010/142837
PCT Pub. Date: Dec. 16, 2010

(65) Prior Publication Data
US 2012/0152281 A1    Jun. 21, 2012

(30) Foreign Application Priority Data

Jun. 12, 2009  (ES) .................................. 200901410
May 31, 2010  (ES) .................................. 201030829

(51) Int. Cl.
*B08B 3/02*  (2006.01)
*B08B 1/04*  (2006.01)
(Continued)

(52) U.S. Cl.
CPC ................. *B08B 1/04* (2013.01); *B08B 3/024* (2013.01); *F24J 2/14* (2013.01); *F24J 2/461* (2013.01); *Y02E 10/45* (2013.01)

(58) Field of Classification Search
CPC ............. F24J 2/461; Y02E 10/40; B08B 1/04; B08B 1/008; E01H 1/005
(Continued)

(56) References Cited

FOREIGN PATENT DOCUMENTS

| CH | 598 422 | 4/1978 | |
| CH | 598422 A * | 4/1978 | ............... E01H 1/10 |

(Continued)

OTHER PUBLICATIONS

Baldini et al., "Mobile Tunnel Cleaning and Spraying Machine" Apr. 1978, Machine Translation.*
(Continued)

*Primary Examiner* — David Cormier
*Assistant Examiner* — Thomas Bucci
(74) *Attorney, Agent, or Firm* — Merchant & Gould P.C.

(57) ABSTRACT

A vehicle and method for cleaning parabolic trough solar collectors (2) by means of a motorized vehicle (1) which includes a water tank (4); front (5) and rear (6) cleaning arms, with a telescopic part having several sections, coupled at one end to a pivoting head (8) which supports a rotary cleaning brush (9) and comprises spray nozzles (10), as well as proximity sensors (12) for the brushes (9). It comprises the same number of front and rear transverse guide rails (13) which include a linear movement means (14) coupled, by means of a pivot (15), to the cleaning arms (5, 6). The brushes (9) are movable in relation to the head (8) by means of a shaft (21) actuated by a retraction actuator (27) for overcoming obstacles (26).

15 Claims, 10 Drawing Sheets

(51) Int. Cl.
*F24J 2/14* (2006.01)
*F24J 2/46* (2006.01)

(58) Field of Classification Search
USPC .......... 134/198, 34, 56 R, 15, 172, 199, 32;
15/320, 340.1, 21.1, 319, 49.1, 50.3,
340.3, 15/368, 4, 88.4, 98, 321; 239/161,
164, 172, 239/146, 722, 163, 169, 246,
550, 562, 73
See application file for complete search history.

(56) References Cited

FOREIGN PATENT DOCUMENTS

| | | | | |
|---|---|---|---|---|
| CH | 598422 | A5 * | 4/1978 | ............... E01H 1/10 |
| CN | 1952266 | | 4/2007 | |
| EP | 0 404 684 | | 12/1990 | |
| EP | 0404684 | * | 12/1990 | |
| EP | 874086 | A1 * | 10/1998 | ............... E01H 1/00 |
| EP | 2 153 914 | | 2/2010 | |
| ES | 265877 | | 2/1983 | |
| ES | 296.855 | | 1/1990 | |
| ES | 1 025 055 | | 11/1993 | |
| ES | 2 267 393 | | 3/2007 | |
| ES | 2 308 921 | | 12/2008 | |
| ES | 2 316 317 | | 4/2009 | |
| ES | 2 350 083 | | 1/2011 | |

OTHER PUBLICATIONS

International Search Report for international application No. PCT/ES2010/070394 mailed Sep. 30, 2010.

* cited by examiner

CLEANING VEHICLE AND METHOD FOR PARABOLIC TROUGH SOLAR COLLECTORS

PRIORITY

This application is a National Stage Application of PCT/ES2010/070394, filed 14 Jun. 2010, which claims benefit of Serial No. P2010030829, filed 31 May 2010 in Spain, and which also claims benefit of Serial No. P200901410, filed 12 Jun. 2009 in Spain, and which applications are incorporated herein by reference. To the extent appropriate, a claim of priority is made to each of the above disclosed applications.

OBJECT OF THE INVENTION

The present invention relates to the technological field of cleaning of solar collectors and describes a vehicle and a method for cleaning parabolic trough solar collectors.

BACKGROUND OF THE INVENTION

Spanish patent application P200901410 describes the cleaning of mirrors of parabolic trough solar collectors The aforementioned application P200901410 relates, according to a first aspect, to a cleaning vehicle for parabolic trough solar collectors, consisting of a motorised vehicle which comprises a water tank included in the vehicle chassis; front and rear cleaning arms, each of which comprises a telescopic part having several sections whereto a head that supports at least one cleaning brush which can rotate around its axis and comprises water spray nozzles is coupled to its free end in a pivoting manner, said vehicle also comprising proximity sensors for the brushes and a pump for feeding water from the tank to the spray nozzles. Additionally, the aforementioned vehicle advantageously includes, on each of the front and rear parts, a transverse guide rail which includes linear movement means whereto the corresponding cleaning arm is coupled, by means of a pivot.

The aforementioned application P200901410 relates, according to a second aspect, to a cleaning method for parabolic trough solar collectors which comprises the following stages:
forward movement of the vehicle until its front part is in front of the collector to be cleaned;
positioning of the arms in their cleaning position;
contact of the rotary brushes with the collector;
forward movement of the vehicle and actuation of the brushes and water sprays; and
end of the cleaning method and retraction of the brushes.

The drawback to be resolved consists of improving the accessibility of the brushes to the largest possible area of collector surface, avoiding the structural obstacles that prevent complete cleaning of certain areas with more difficult access.

DESCRIPTION OF THE INVENTION

According to a first aspect of the invention, a cleaning vehicle for parabolic trough solar collectors which comprises a motorised vehicle equipped with a water tank is presented. The vehicle includes front and rear cleaning arms, each of which comprises a telescopic part having several sections whereto a pivot head that supports at least one cleaning brush which can rotate around its axis and comprises water spray nozzles is coupled to its free end in a pivoting manner, said vehicle also comprising proximity sensors for the brushes and a high-pressure pump for feeding water from the tank to the spray nozzles. Additionally, the aforementioned vehicle advantageously includes, on each of the front and rear parts, a transverse guide rail which includes linear movement means whereto the corresponding cleaning arm is coupled, by means of a pivot.

Optionally, at least one of the cleaning brushes of at least one of the cleaning arms is movable in relation to the corresponding pivot head by means of a shaft connected to said cleaning brush and actuated by means of a retraction actuator. Said refraction actuator can receive a signal from the proximity sensors when said proximity sensors detect the presence of an obstacle susceptible of interfering with any of the cleaning brushes, for example structural obstacles such as access ladders for repairing collectors; projecting absorber tube supports; collector structure pillars, etc. Therefore, the retraction actuator moves the shaft connected to the affected cleaning brush in order to overcome said obstacle. Once said obstacle has been overcome, the retraction actuator returns the cleaning brush to its cleaning position. Preferably, the shaft connected to said cleaning brush rotates in relation to the corresponding pivot head around a fixed point therefrom.

As mentioned earlier, the invention includes a rear cleaning arm disposed on the rear part and a front cleaning arm disposed on the front part. The cleaning brushes of each of the cleaning arms clean the part of the collector located above or below the absorber tube. Preferably, the rear cleaning arm is in charge of cleaning the lower part of the collector and the front cleaning arm is in charge of cleaning the upper part, although the characteristics of the invention are not affected if the functions of the cleaning arms are interchanged. However, in either case, when the truck reaches the end of its path (alternatively, at the start of the path) an area of the collector has not been cleaned by the rear cleaning arm (alternatively by the front cleaning arm), approximately equal in length to that of the cleaning vehicle. The vehicle does not generally have enough room to continue advancing due to economic design restraints for the installation of collector fields.

Due to this, the invention envisages the rotation of the cleaning arms, in such a manner that both cleaning arms slide along the guide rails and, where applicable, pivot in order to move from a higher position to a lower position and vice versa. Next, the vehicle resumes the cleaning in reverse gear over the necessary distance. This will allow complete cleaning of the area of the collector opposite the vehicle in any of the end positions of the cleaning path.

The vehicle of the invention is adequate for cleaning, in those cases where it is possible and recommendable, by means of pressurised water, dispensing with the cleaning brushes.

The different vehicle operating modes, the different water circuits and the hydraulic system used are described below. The cleaning vehicle is equipped with a main motive pump which in turn allows actuation of the pumps that activate the movement of the cleaning brushes, low-pressure water circuit pump(s) and the repowering or high-pressure water circuit pump(s).

These two pressurised water circuits (high and low-pressure water) and the cleaning brushes of the front and rear cleaning arms are actuated by a single hydraulic circuit on the vehicle chassis.

The hydraulic system of the vehicle, which includes actuation of the low-pressure pump(s) and high-pressure pump(s), are always working, but selection between the low or high-pressure water circuit systems is carried out by closing or opening valves.

The combination of use of said pumps will give rise to different cleaning vehicle operating modes.

The vehicle has three cleaning modes:

1.—Brushing with low-pressure water.

Movement of the front and rear cleaning arms, which implies cleaning with a cleaning brush fed by the low-pressure water circuit, which will be expelled through the low-pressure nozzles of the cleaning brushes, which differ from the high-pressure nozzles.

In this case, the hydraulic system of the vehicle functions by moving the front and rear cleaning arms (by means of the pump(s) which activate the cleaning brushes).

The low-pressure pump(s) is(are) used to feed low-pressure water to the cleaning brushes. These pump(s) are used to moisten and clean the mirrors by means of brushing.

2.—Cleaning using only high-pressure water.

In this operating mode, the vehicle does not use the cleaning brushes, but rather only pressurised water and is destined for less thorough cleaning, but which allow cleaning of a greater surface area per unit of time.

In this cleaning mode, the hydraulic system of the cleaning vehicle is in charge of moving the high-pressure water pump(s). This(These) pump(s) are used for cleaning with the high-pressure bar, which allows water to be projected at a distance in substitution of the cleaning brushes and has a valve which allows cleaning of only the central zone at high pressure or the entire surface and cleaning of the absorber tube by feeding two independent nozzles, one on each cleaning arm, which project water onto said absorber tube.

3.—Cleaning with cleaning brushes, using high-pressure water and cleaning of the tube.

Comprehensive cleaning system, wherein all the systems are used: brushing with high-pressure water using high-pressure cleaning nozzles (different to low-pressure nozzles), cleaning using a high-pressure bar and cleaning of the tube using high-pressure water.

For very delicate zones where cleaning using the aforementioned systems is not possible, a winding frame is used (system consisting of a reel disposed in the central part of the vehicle, wherearound a hose with a gun is wound), which allows manual cleaning by the vehicle operator.

Additionally, the vehicle of the invention comprises a control system for maintaining the relative work position between the collectors and the vehicle, also preventing the vehicle from colliding with the collectors. The control system comprises:

Electrical dashboards and wiring, and programmable automation.

Sensors that control the position of the cylinders which actuate the cleaning arms, whether inductive cylinders, potentiometers or encoder.

Cab-mounted radar sensors to establish the relative position between the vehicle and the mirrors and to position the cleaning arms in their work position.

Ultrasound sensors to detect the limits of the mirror, both on the front cleaning arm and rear cleaning arm. These are useful for overcoming relative inclinations between the ground and the collectors and for overcoming changes in ground level.

Ultrasound sensors for maintaining a constant work distance.

Stabiliser system to rigidify the rear axle suspension, minimising cleaning arm oscillation.

Cab-mounted display with dashboard and control to allow manipulation of the cleaning arms in automatic and manual mode.

Control system to minimise human intervention, equipped with automatic positioning and cleaning mode keys.

Camera circuit with cab-mounted screen display to control the position of the cleaning brushes during cleaning operations and transport throughout the plant.

Work lights for nighttime operation which do not dazzle the driver of the vehicle.

According to a second object of the invention, a cleaning method for parabolic trough solar collectors is presented which comprises the following steps:

forward movement of the vehicle until its front part is in front of the collector to be cleaned;

positioning of the cleaning arms in their cleaning position;

contact of the rotary cleaning brushes with the collector;

forward movement of the vehicle and actuation of the cleaning brushes and water sprays; and end of the cleaning method and retraction of the cleaning brushes.

Advantageously, the method includes the additional steps of detecting the proximity of an obstacle susceptible of colliding with one of the cleaning brushes, actuating the retraction means of said cleaning brushes in order to withdraw them and position the affected cleaning brushes in their cleaning position once the obstacle has been overcome.

The method of the invention may additionally include a step wherein the position of the cleaning arms is interchanged, in such a manner that the cleaning brush which is initially in the upper part moves to the lower part and vice versa.

DESCRIPTION OF THE DRAWINGS

For the purpose of complementing the description being made and with the object of helping to better understand the characteristics of the invention, in accordance with a preferred example of practical embodiment thereof, a set of drawings has been included as an integral part of said description wherein the following has been represented in an illustrative and non-limiting manner.

PREFERRED EMBODIMENT OF THE INVENTION

Figure 1:
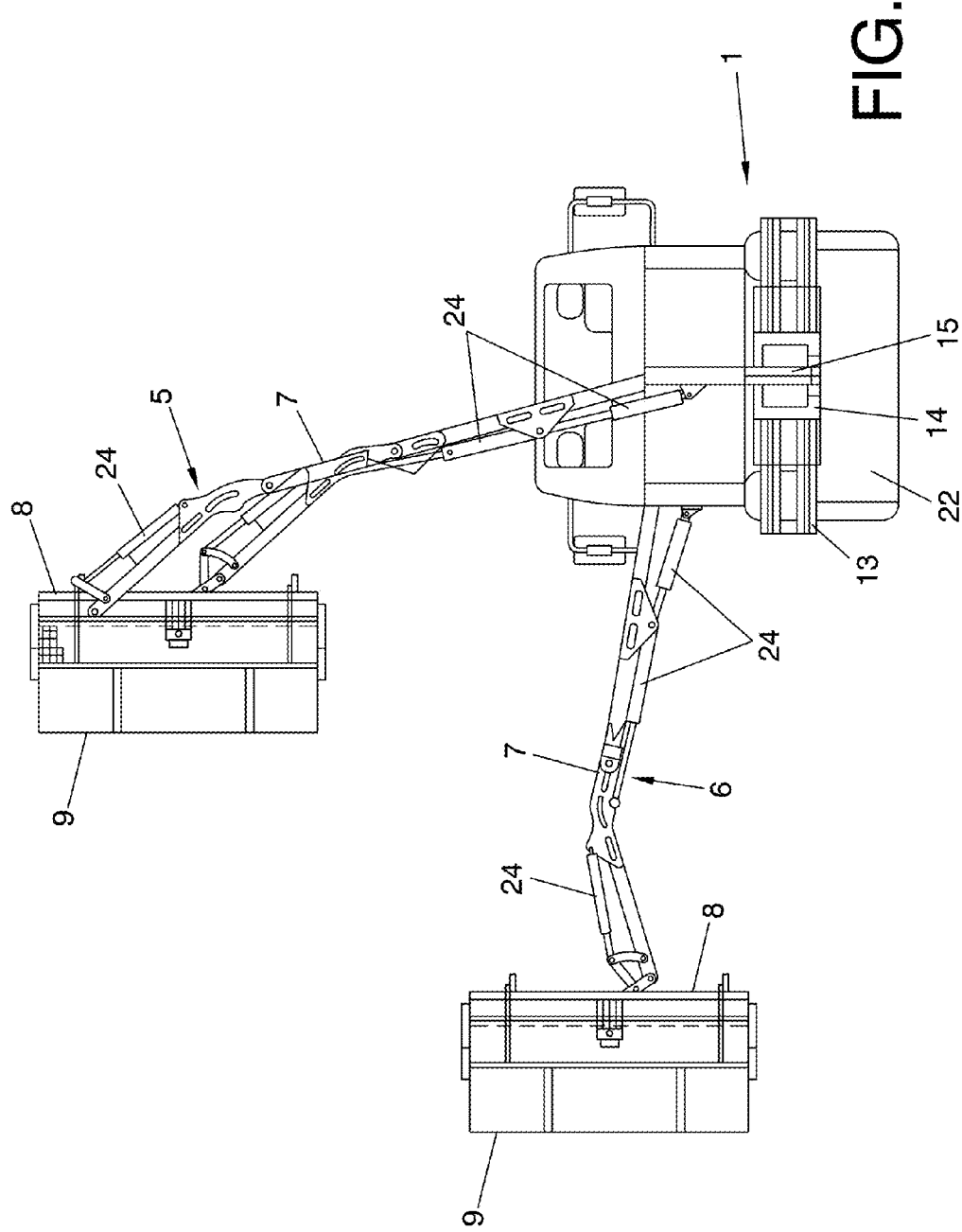
FIG. 1 shows a front view of a cleaning vehicle for parabolic trough solar collectors according to the invention.
Figure 2:
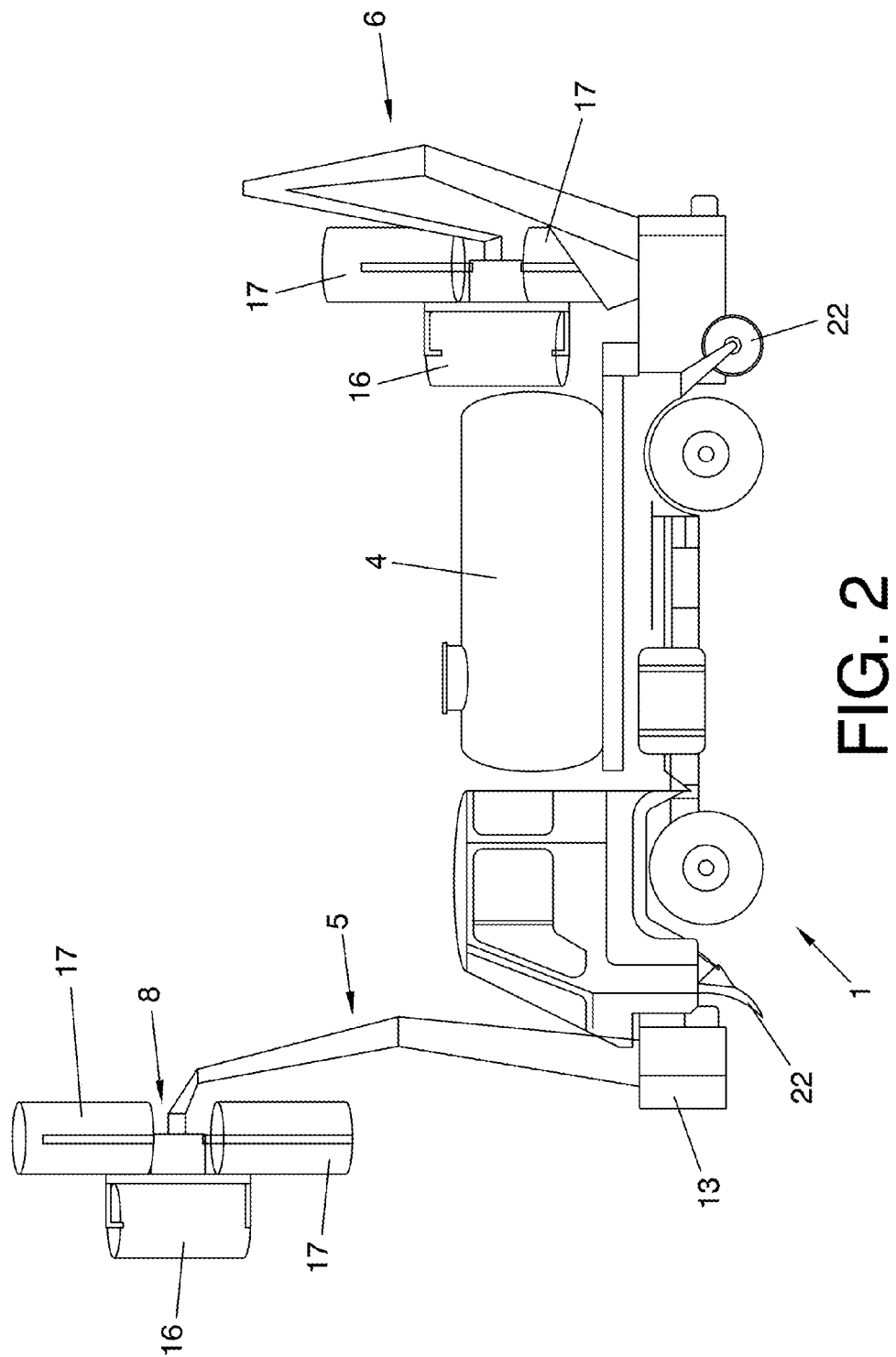
FIG. 2 shows a side view of the vehicle of FIG. 1.

FIGS. 1 and 2 represent a cleaning vehicle (1) for parabolic trough solar collectors (2) according to the invention.

It is a motorised vehicle which includes a water tank (4). The tank (4) is manufactured from fibreglass-reinforced polyester, which allows greater load capacity and improved anti-corrosion performance. Said tank (4) is cylindrical in shape and equipped with transverse water breakers manufactured from the same material as the tank (4) itself, for the purpose of dividing the tank (4) into interconnected compartments.

Likewise, the existence of front (5) and rear (6) cleaning arms can be observed, each of which have a telescopic part (7) with several sections. A pivot head (8) that supports a cleaning brush (9, 16, 17) which can rotate around its axis is coupled to the free end of the cleaning arms (5, 6). First water spraying nozzles (10) having an adjustable cross-section, which are fed by a pump capable of supplying water from the tank, are disposed on the pivot head (8). The pump may be a high-pressure pump or a low-pressure pump. Therefore, there are first spraying nozzles (10) adapted to be fed by high-pressure water and first spraying nozzles (10) adapted to be fed by low-pressure water.

Ultrasound-based proximity sensors (12) control the proximity of the cleaning brushes (9, 16, 17) to the solar collector (2).

Figure 3:
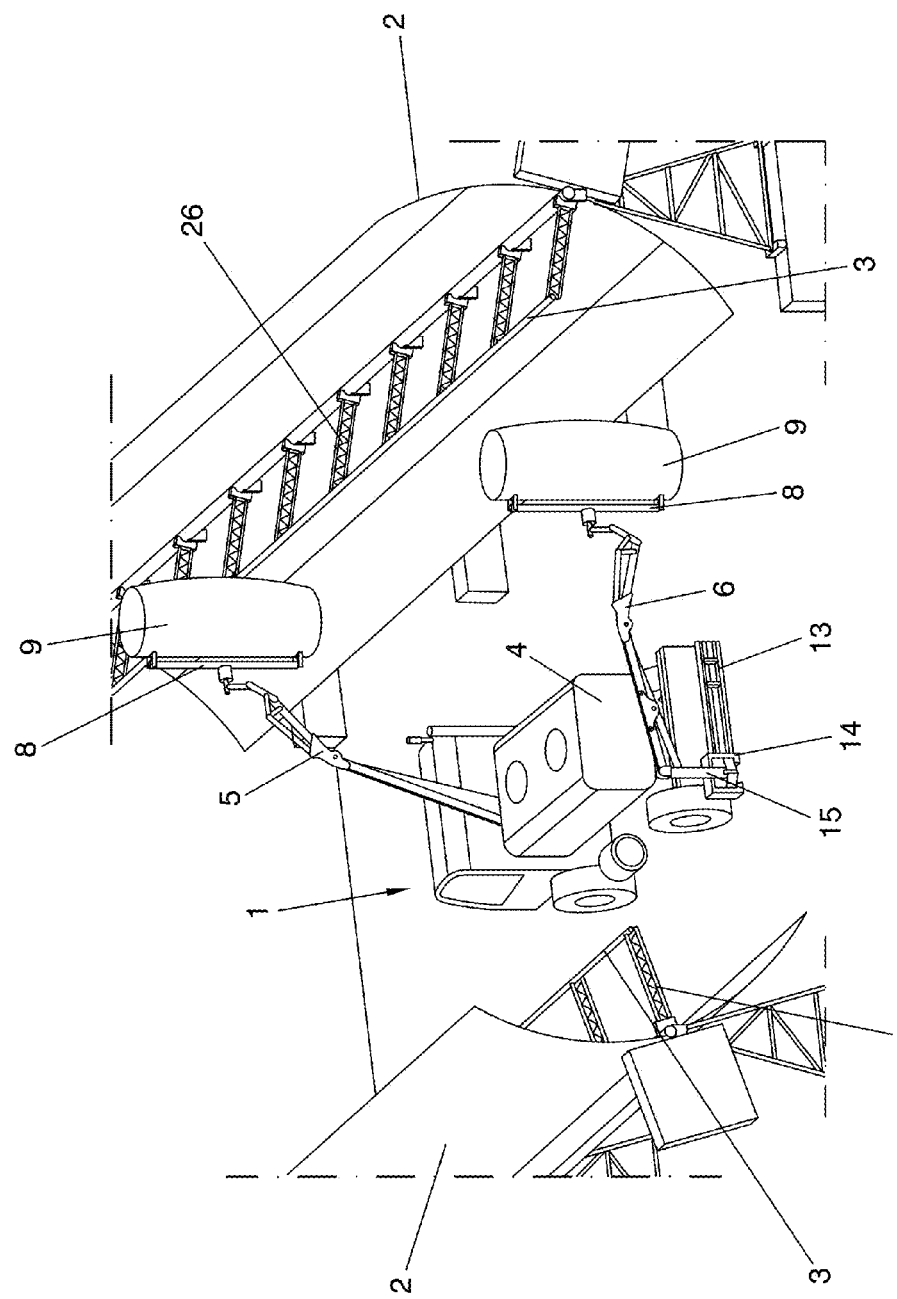
FIG. 3 shows the vehicle in operation.

As can be observed in FIGS. 1, 2 and 3, transverse guide rails (13), which include linear movement means (14), which can be transversely transferred from one side of the vehicle (1) to the other are mounted on the front and rear parts thereof. The cleaning arms (5, 6) are disposed on a pivot (15) which is coupled projecting from the movement means (14). Therefore, the cleaning arms (5, 6) can operate both on the right side and on the left side within an angular range of 180°.

FIG. 3 represents the vehicle (1) for cleaning parabolic trough solar collectors (2) of FIGS. 1 and 2 in operation. Specifically, in the position shown of said figure, the vehicle (1) is cleaning the reflective surfaces located on the right, although it would also be possible, due to the previously detailed position, to clean the reflective surfaces located on the left, on being able to rotate the cleaning arms (5, 6) by means of the pivot elements (15).

The cleaning brushes (9, 16, 17) have a curved-convex profile for the purpose of better adapting to the parabolic curvature of the collector (2), preventing it from coming into contact with the absorber tube (3). The bristles or any other adequate cleaning brush (9, 16, 17) material are of a type that does not damage the surface of the mirrors, i.e. it does not cause breakage or scratching. Their diameter may be variable to adapt to the mirrors.

The cleaning arms (5, 6) comprise hydraulic cylinders (24) which allow extension or contraction of the corresponding sections of said cleaning arms (5, 6) as it may be necessary during operation.

Figure 4:
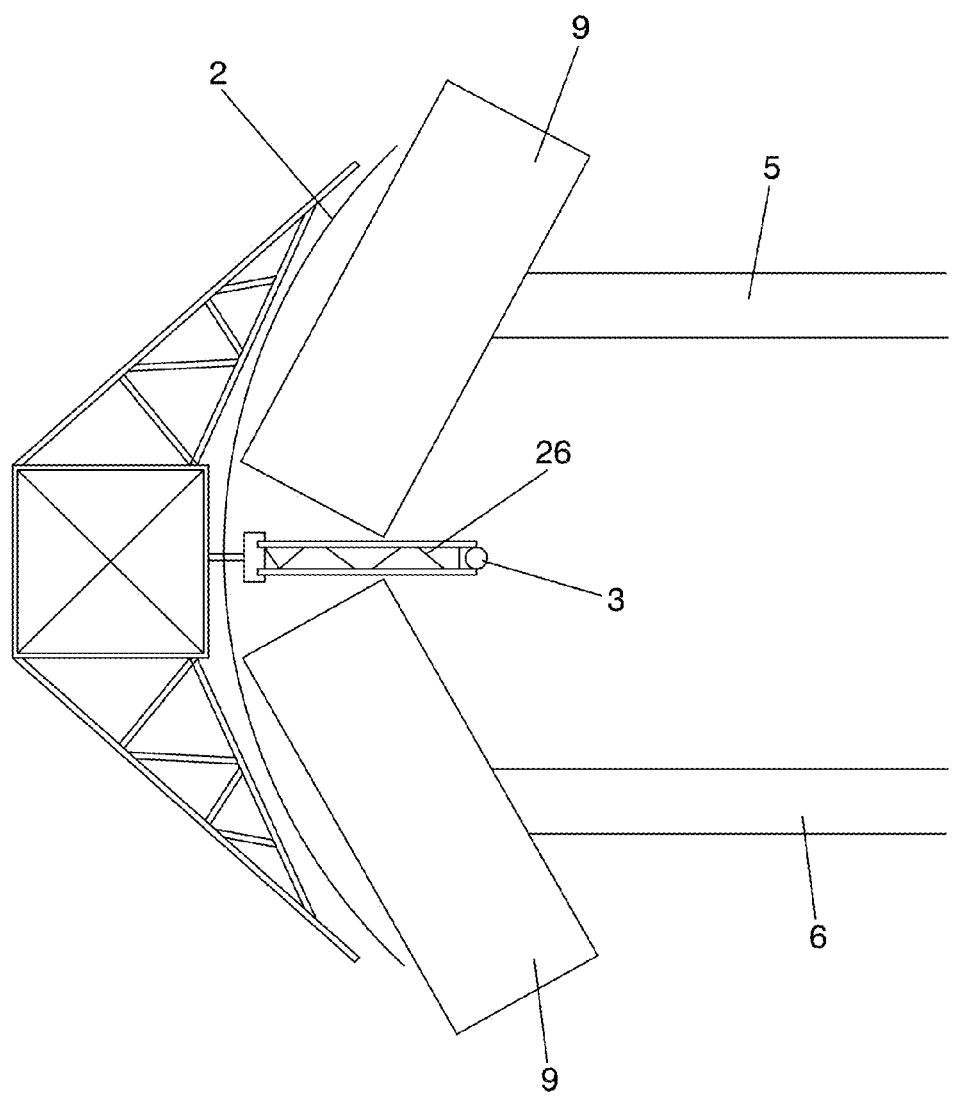
FIG. 4 shows a schematic view of the cleaning arms and cleaning brushes of the vehicle on a surface.
Figure 6:
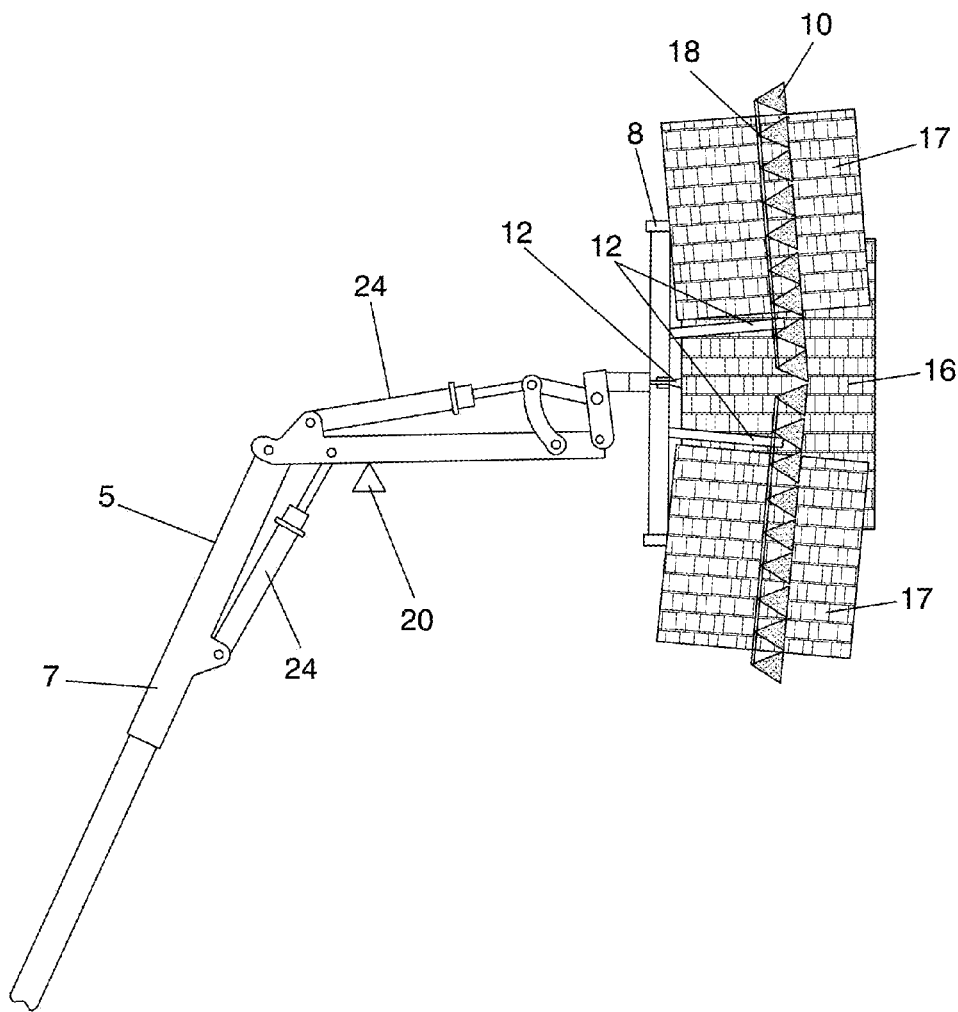
FIG. 6 shows a side view of the coupling between the cleaning arm and the composite cleaning brushes.

FIG. 4 shows that the cleaning brush (9, 16, 17) of the front cleaning arm (5) cleans the collector (2) above the absorber tube (3), while the rear cleaning arm (6) cleans below the absorber tube (3). In FIG. 6, pivot heads (8) that include several cleaning brushes (9, 16, 17) can be observed. Each pivot head (8) comprises a central cleaning brush (16) and at least one side cleaning brush (17) on either side, with opposing inclinations with regard to the central cleaning brush (16). Each side cleaning brush (17) has an cleaning arm which can be moved by means of an independently controlled hydraulic circuit in order to adjust the angle of inclination, adapting the cleaning brushes (16, 17) to the curvature of the collector (2). The cleaning brushes (16, 17) are equipped with the same number of spray bars (18) disposed on the front part and on the rear part, said spray bars (18) being equipped with water first spray nozzles (10) (see FIGS. 6 and 7).

Figure 7A:
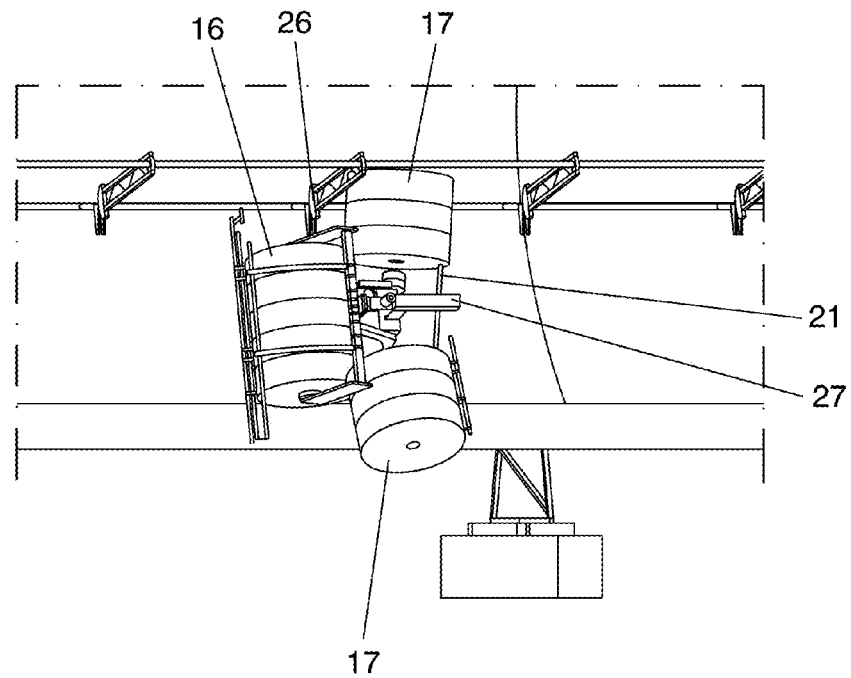
FIGS. 7a and 7b show the refraction of the cleaning brushes to overcome an obstacle.
Figure 7B:
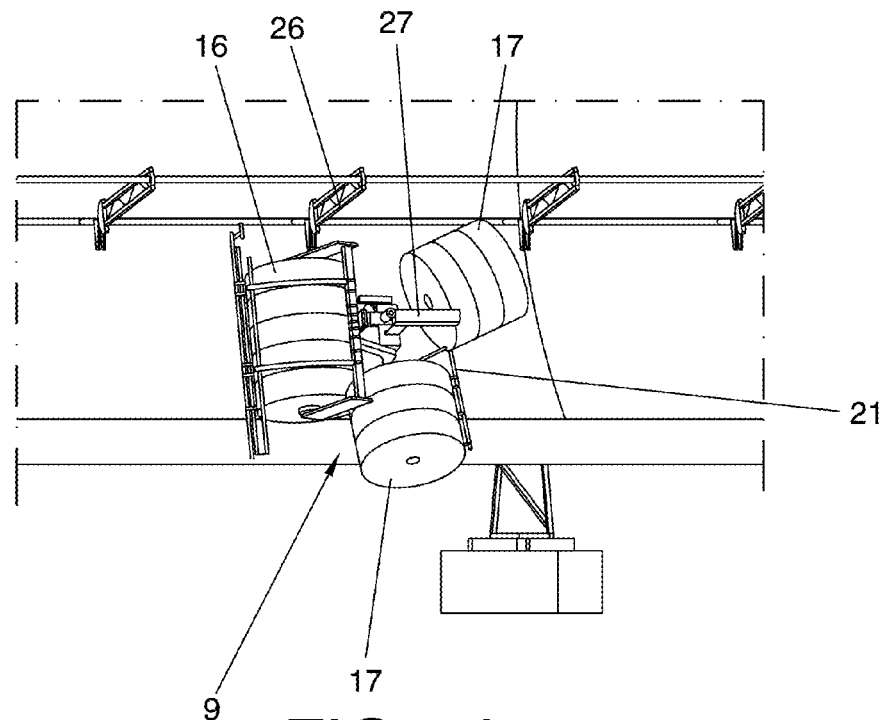

In FIGS. 7a and 7b it can be observed that at least one of the cleaning brushes (16, 17) of at least one of the cleaning arms (5, 6) is movable with regard to the corresponding pivot head (8) by means of a shaft (21) connected to said cleaning brush (16, 17) and actuated by means of a retraction actuator (27). Said retraction actuator (27) can receive a signal from the proximity sensors (12) when said proximity sensors (12) detect the presence of an obstacle (26) susceptible of interfering with one of the cleaning brushes (16, 17), for example structural obstacles (26) such as access ladders for repairing collectors; projecting absorber tube supports; collector structure pillars, etc. In this manner, the retraction actuator (27) causes the shaft (21) connected to the affected cleaning brush (16, 17) to move in order to overcome said obstacle (26). Once the obstacle (26) has been overcome, the retraction actuator (27) returns the cleaning brush (16, 17) to its cleaning position. Preferably, the shaft (21) is pivoted in relation to the corresponding pivot head (8).

Figure 5A:
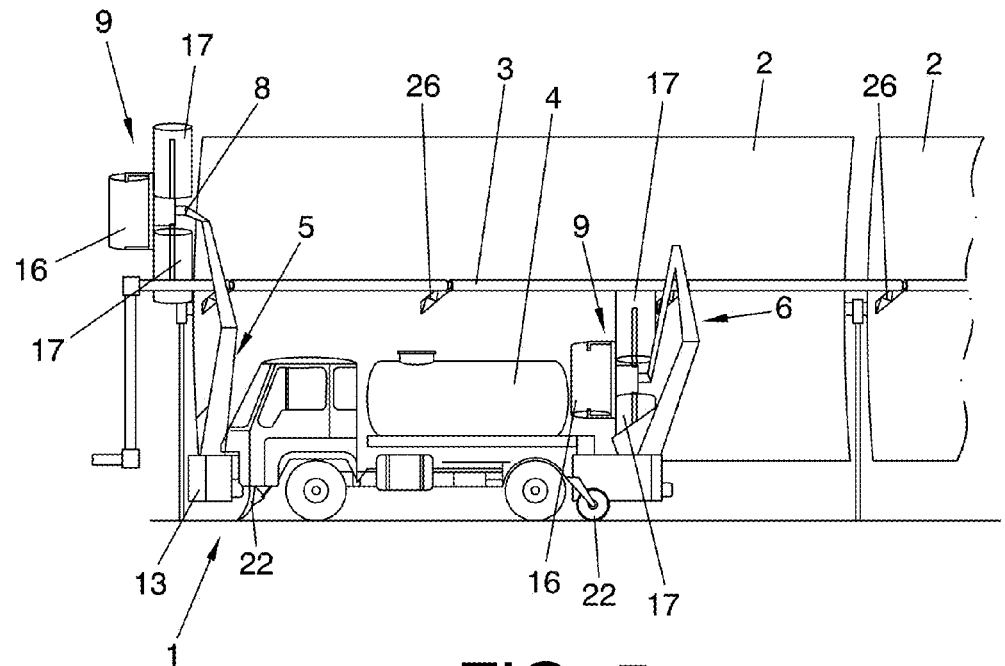
FIGS. 5a and 5b show the rotation of the cleaning arms at the end of the path for interchanging the upper and lower positions thereof.
Figure 5B:
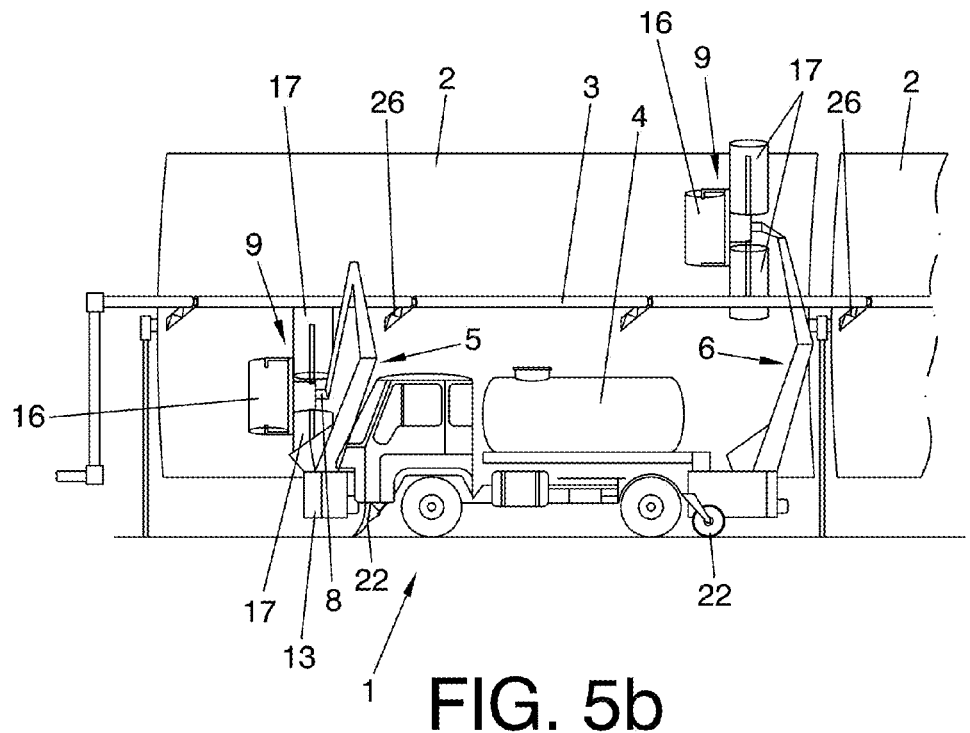

The invention envisages, as shown in FIGS. 5a and 5b, the pivoting of the cleaning arms (5, 6), in such a manner that both cleaning arms (5, 6) slide along the guide rails (13) and, where applicable, pivot in relation to the pivot (15) in order to interchange their position from upper to lower position and vice versa. Next, the vehicle (1) resumes the cleaning method in reverse gear over the necessary distance. This will allow complete cleaning of the area of the collector (2) opposite the vehicle (1) in any of the end positions of the cleaning path.

The cleaning arms (5, 6) include, on their elbowed part, at least one second spraying nozzle (20) for cleaning the absorber tube. The cleaning arms (5, 6) are controlled by means of a joystick and a dashboard from the driver's seat of the vehicle (1).

Due to the irregularity of the ground, the invention comprises a hydraulic control circuit that regulates the lateral inclination of the cleaning arms (5, 6) in relation to the vehicle (1) chassis, controlling the coupling of the cleaning arms (5, 6) to the movement means (14), as well as another hydraulic circuit for adjusting the inclination of the pivot head (8) in relation to the cleaning arms (5, 6), compensating the possible inclination of the ground. The vehicle is also equipped with smoothing means (22) for smoothing the ground surface and mitigating the effect of irregularities.

The pivot head (8) comprises several adjustable support legs, preferably four, on which to rest the pivot head (8) on the ground in the event of having to replace any element.

The vehicle (1) also includes side work lights in order to perform the cleaning at night.

Figure 8A:
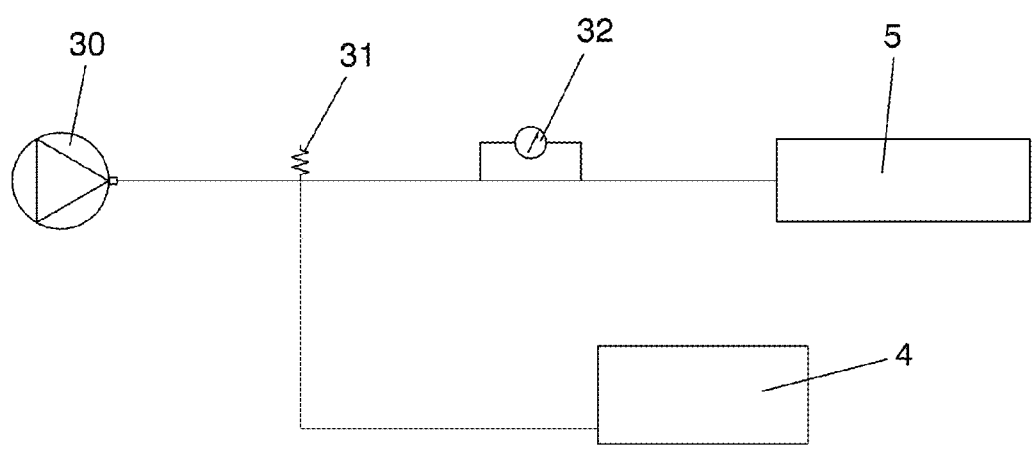
FIGS. 8a and 8b respectively show a detailed view of the hydraulic diagram, particularly of the high-pressure water circuit of the cleaning brushes in the front cleaning arm and the rear cleaning arm.

FIG. 8a shows a detailed view of the hydraulic diagram of the vehicle relating to the supply of high-pressure water to the cleaning brushes (16, 17) of the front cleaning arm (5), where the high-pressure water pump (30) that supplies water selectively through a first valve (31) towards the front cleaning arm (5) or towards the tank (4) can be observed. A first manometer (32) for controlling pressure is disposed between the first valve (31) and the front cleaning arm (5).

Figure 8B:
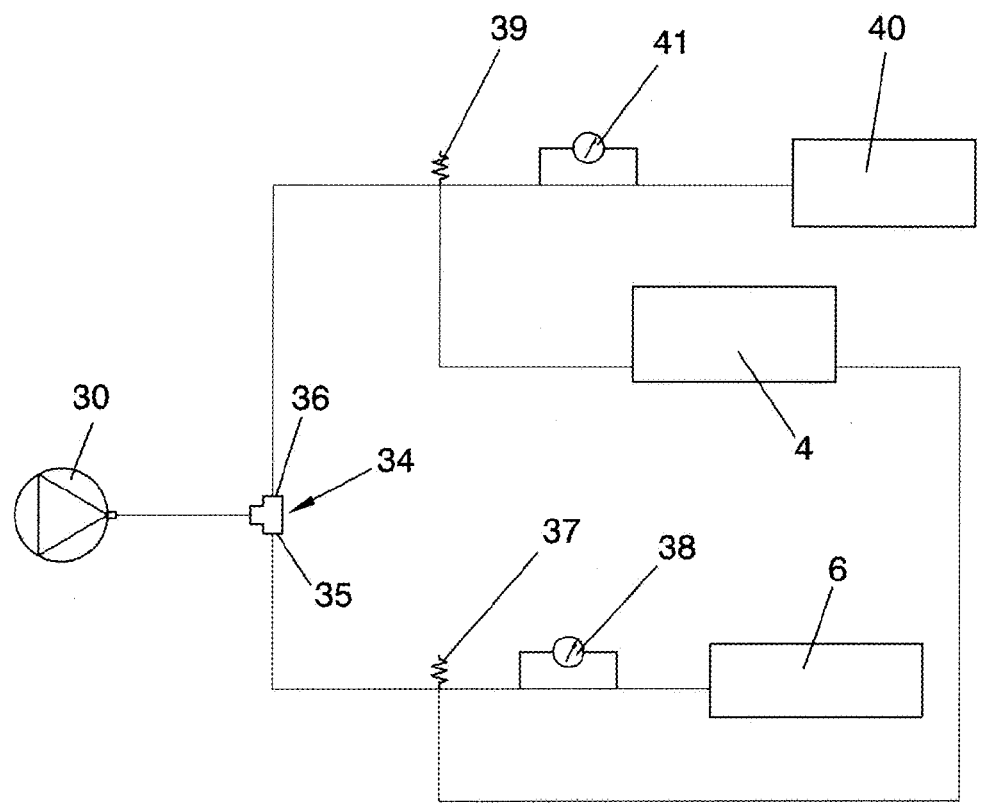

FIG. 8b shows a detailed view of the hydraulic diagram of the vehicle relating to the supply of high-pressure water to the cleaning brushes (9, 16, 17) of the rear cleaning arm (6), where the high pressure water pump (30) that supplies water towards a three-way valve (34), having a first outlet (35) and a second outlet (36), can be observed. The first outlet (35) directs the water selectively through a second valve (37) towards the rear cleaning arm (6) or towards the tank (4). A second manometer (38) for controlling pressure is disposed between the second valve (37) and the rear cleaning arm (6). The second outlet (36) directs the water selectively through a third valve (39) towards a winding frame (40) or towards the tank (4). A third manometer (41) is disposed between the second valve (37) and the winding frame (40).

Figure 9:
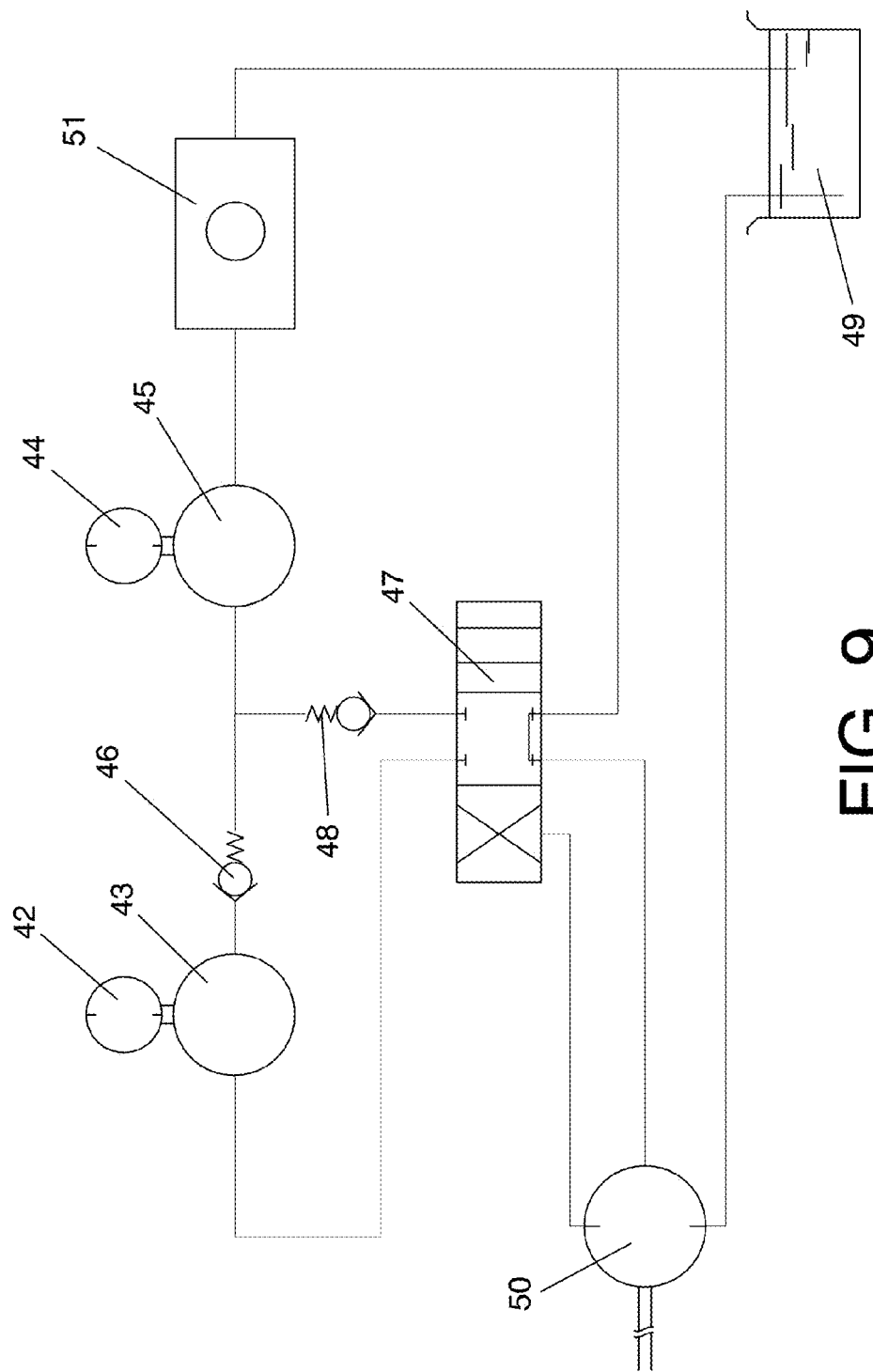
FIG. 9 shows another part of the hydraulic diagram of the low-pressure circuit of the vehicle object of the invention.

FIG. 9 shows another part of the hydraulic diagram of the vehicle (1). The vehicle (1) is equipped with a front low-pressure pump (42) fed by a front motor (43) and a rear low-pressure pump (44) fed by a rear motor (45). The front (43) and rear (45) motors are separated by a first anti-spillback valve (46). A distributor (47) distributes oil selectively to both motors (43, 45) or only to the rear motor (45), in this case by means of a second anti-spillback valve (48). The distributor (47) is fed oil from an oil tank (49) by a pump (50) of the vehicle. The oil returns to the tank (49) after passing through a cooler (51).

A cleaning method for solar collectors which uses the previously described cleaning vehicle (1) is described below. The method comprises the following steps:

i) forward movement of the vehicle (1) until its front part is positioned opposite the collector (2) to be cleaned;
j) positioning of one of the cleaning arms (5, 6) at a height greater than the absorber tube (3) and of the other cleaning arm (5, 6) at a height lower than said absorber tube (3); preferably, the front cleaning arm (5) is disposed at a greater height and the rear cleaning arm (6) at a lower height;
k) approximation, by means of the respective linear movement means (14), of the am (5, 6), respectively disposed above and below the absorber tube (3), to the upper part and to the lower part of the collector (2);
l) extension towards the collector (2) of the front cleaning arm (5) until at least one cleaning brush (9, 16, 17) comes into contact with the collector (2), and the pivot head (8) and at least one side cleaning brush (17) acquire the adequate inclination;
m) forward movement of the vehicle (1) at working speed, parallel to the collector (2), spraying of water through the spray nozzles (10, 20) and cleaning of the upper part of the collector (2) by the cleaning brushes (9, 16, 17), simultaneously;
n) when the rear part of the vehicle (1) is positioned opposite the collector (2), extension towards the collector (2) of the rear cleaning arm (6) until at least one cleaning brush (9, 16, 17) comes into contact with the collector (2), and the pivot head (8) and at least one side cleaning brush (17) acquire the adequate inclination;
o) simultaneous to the cleaning carried out in step e), cleaning of the lower part of the collector (2), with water and removal of the dirt that falls from the upper part; and
p) arrival of the vehicle at the end of the collector (2) and contraction of the cleaning arm (5, 6) sections towards the vehicle.

The method comprises the following additional steps:
detection, by the proximity sensors (12), of an obstacle susceptible of colliding with one of the cleaning brushes (9, 16, 17) during cleaning;
retraction, by means of the retraction means, of the affected cleaning brushes (9, 16, 17), continuing the cleaning until the obstacle has been overcome; and
reincorporation of the cleaning brushes (9, 16, 17) affected by the obstacle to their cleaning position.

The method of the invention may include the following steps after step h):

movement and pivoting of the cleaning arms (5, 6) in such a manner that the cleaning arm (5, 6) which occupies the upper position will occupy the lower position and vice versa; movement of the vehicle (1) in reverse gear and cleaning of the areas of the collector (2) that could not be cleaned during forward direction of movement.

Additionally the method may comprise an additional step for cleaning the absorber tube (3) by means of the second water spraying nozzles (20) disposed on the elbowed part of the cleaning arms (5, 6).

The invention claimed is:

1. A vehicle for cleaning parabolic trough solar collectors, the vehicle comprising:
   a motorized vehicle comprising a front part, a rear part, a chassis, and a water tank included in the chassis;
   a front cleaning arm located at the front part, and a rear cleaning arm located at the rear part, each comprising a telescopic part having several sections;
   a pivot head pivotally coupled to a free end of the telescopic part of the corresponding front arm or rear arm, said pivot head supporting at least one cleaning brush which is rotatable around its axis and comprises water spraying nozzles;
   proximity sensors for controlling the proximity of the at least one cleaning brush to the solar collector;
   a high-pressure pump for feeding the spraying nozzles with water from the tank;
   a transverse guide rail disposed on each of the front part and the rear part of the vehicle;
   a linear movement mechanism disposed on each of the transverse guide rails, for providing linear movement to the cleaning arms along the transverse guide rails;
   a shaft, connected to at least one of the at least one cleaning brush of at least one of the cleaning arms, for moving said at least one cleaning brush in relation to the corresponding pivot head;
   a retraction actuator for actuating said shaft, said retraction actuator being suitable for causing the movement of the shaft in order to overcome an obstacle susceptible of interfering with at least one of the at least one cleaning brush, when receiving a signal from the proximity sensors detecting the presence of said obstacle;
   a first valve for selectively supplying water from the high-pressure water pump towards the front cleaning arm or towards the tank; and
   a first manometer for controlling the pressure between the first valve and the front cleaning arm.

2. The vehicle for cleaning parabolic trough solar collectors of claim 1, wherein the at least one cleaning brush comprises:
   a central cleaning brush, and
   at least one side cleaning brush on either side with opposed inclinations in relation to the central cleaning brush.

3. The vehicle for cleaning parabolic trough solar collectors of claim 1, wherein the spraying nozzles comprise first spraying nozzles at a spray bar located at each of the cleaning arms, disposed on each of the front part and the rear part.

4. The vehicle for cleaning parabolic trough solar collectors of claim 1, wherein the spraying nozzles further comprise at least one second spraying nozzle located on an elbowed part of the cleaning arms for cleaning an absorber tube provided in the parabolic trough solar collector.

5. The vehicle for cleaning parabolic trough solar collectors of claim 1, wherein the at least one cleaning brush has a curved-convex profile.

6. The vehicle for cleaning parabolic trough solar collectors of claim 1, further comprising work lights for night time operation.

7. The vehicle for cleaning parabolic trough solar collectors of claim 1, wherein the cleaning arms comprise hydraulic cylinders which allow extension or contraction of the corresponding sections of the telescopic part.

8. The vehicle for cleaning parabolic trough solar collectors of claim 1, further comprising work lights for night time operation.

9. A vehicle for cleaning parabolic trough solar collectors, the vehicle comprising:
   a motorized vehicle comprising a front part, a rear part, a chassis, and a water tank included in the chassis;
   a front cleaning arm located at the front part, and a rear cleaning arm located at the rear part, each comprising a telescopic part having several sections;
   a pivot head pivotally coupled to a free end of the telescopic part of the corresponding front cleaning arm or rear cleaning arm, said pivot head supporting at least one cleaning brush which is rotatable around its axis and comprises water spraying nozzles;
   proximity sensors for controlling the proximity of the at least one cleaning brush to the solar collector;
   a high-pressure pump for feeding the spraying nozzles with water from the tank;
   a transverse guide rail disposed on each of the front part and the rear part of the vehicle,
   a linear movement mechanism disposed on each of the transverse guide rails, for providing linear movement to the front and rear cleaning arms along the traverse guide rails;
   a shaft, connected to at least one of the at least one cleaning brush of at least one of the front and rear cleaning arms, for moving said at least one cleaning brush in relation to the corresponding pivot head;
   a retraction actuator for actuating said shaft, said retraction actuator being suitable for causing the movement of the shaft in order to overcome an obstacle susceptible of interfering with at least one of the at least one cleaning brush, when receiving a signal from the proximity sensors detecting the presence of said obstacle;
   a three-way valve comprising:
      a first outlet for directing the water selectively from the high-pressure water pump through a second valve towards the rear cleaning arm or towards the tank, and a second outlet for directing the water selectively through a third valve towards a winding frame or towards the tank; and
      a first manometer for controlling pressure between the second valve and the rear cleaning arm, and a second manometer for measuring pressure between the second valve and the winding frame.

10. The vehicle for cleaning parabolic trough solar collectors of claim 9, wherein the at least one cleaning brush comprises:
    a central cleaning brush, and
    at least one side cleaning brush on either side with opposed inclinations in relation to the central cleaning brush.

11. The vehicle for cleaning parabolic trough solar collectors of claim 9, wherein the spraying nozzles comprise first spraying nozzles at a spray bar located at each of the cleaning arms, disposed on each of the front part and the rear part.

12. The vehicle for cleaning parabolic trough solar collectors of claim 9, wherein the spraying nozzles further comprise at least one second spraying nozzle located on an elbowed part of the cleaning arms for cleaning an absorber tube provided in the parabolic trough solar collector.

13. The vehicle for cleaning parabolic trough solar collectors of claim 9, wherein the at least one cleaning brush has a curved-convex profile.

14. The vehicle for cleaning parabolic trough solar collectors of claim 9, wherein the cleaning arms comprise hydraulic cylinders which allow extension or contraction of the corresponding sections of the telescopic part.

15. The vehicle for cleaning parabolic trough solar collectors of claim 9, wherein the shaft is pivotable in relation to the corresponding pivot head around a point of said pivot head.

\* \* \* \* \*